July 5, 1955  L. K. CHENEY ET AL  2,712,550
PROCESS OF PREPARING TOLUIC ACIDS
Filed Oct. 23, 1953
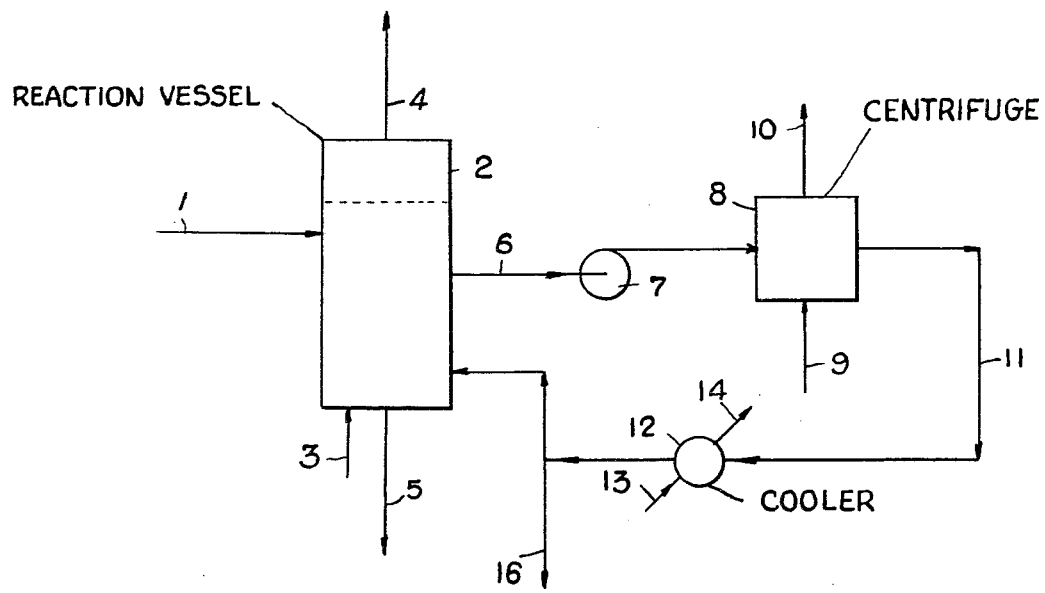
INVENTORS
LEROY K. CHENEY
CHESTER M. HIMEL
BY
Adams, Forward and McLean
ATTORNEYS United States Patent Office 2,712,550
Patented July 5, 1955

2,712,550

PROCESS OF PREPARING TOLUIC ACIDS

Leroy K. Cheney, Arcadia, and Chester M. Himel, Menlo Park, Calif., assignors to Richfield Oil Corporation, Los Angeles, Calif., a corporation of Delaware Application October 23, 1953, Serial No. 388,038

2 Claims. (Cl. 260—524)

Our invention relates to improvements in the manufacture of toluic acids by oxidizing the corresponding xylenes.

It is known to prepare toluic acids by oxidizing xylenes in liquid phase using as a catalyst a cobalt, manganese or cerium salt which is soluble in the reaction mixture. The oxidation is carried out under elevated conditions of temperature and pressure in the presence of air or other oxygen-rich gas used as the oxidizing medium. The individual xylene isomers or mixtures thereof can be used as the starting material.

The oxidation of xylenes is a highly exothermic reaction. In the commercial practice of the oxidation reaction, a rapid rate of oxidation and high throughputs of reactants are desirable in order to operate at a reasonable production rate for a given plant size. This can be accomplished only if the large amounts of heat produced in the oxidation can be removed readily and quickly. External or internal heat exchangers are often used in commercial practice for this type of exothermic process. However, we have found that when the usual type of heat exchangers are used in the xylene oxidation system they become fouled very rapidly, lose their efficiency, and are very costly to operate.

We have observed that in the oxidation of xylenes, varying amounts of phthalic acids are produced in the oxidation mixture in addition to the production of toluic acids and intermediate oxidation products. Phthalic acids are unique in this system and are distinguished from toluic acids in the reaction mixture by their substantial insolubility. As a result, the phthalic acids precipitate from the reaction mixture, particularly on heat exchange surfaces, cutting down their efficiency and making it difficult or costly to maintain proper reaction conditions.

Since the phthalic acids are insoluble in the reaction mixture it was considered probable that simple, continuous filtration of the oxidation mixture would keep the concentration of the phthalics at a very low value and eliminate, to a large extent, their effect in the fouling of the heat exchange surfaces. However, such a filtration not only removes the phthalic acids but also appreciable amounts of catalyst, affects the rate of the oxidation reaction, the product distribution, and contaminates the recovered phthalic acids. We have found, however, that the filtration can be carried out under certain specific operational conditions which are described more fully below.

Our invention is an improvement in the general process just described for the manufacture of toluic acids in which phthalic acids are also produced. Our invention contemplates a series of processing steps which make possible adequate heat control and hence proper reaction temperature over an extended period of operating time and avoids the difficulty normally encountered as a result of phthalic acid production.

We do this by carrying out the xylene oxidation in a conventional reaction vessel provided with an internal or external heat exchanger. In order to prevent the precipitation of phthalic acids upon the surface of the heat exchanger with consequent impairment of its heat exchange efficiency, we withdraw a stream of reaction liquid and filter that stream in the presence of air or other oxygen-rich gas and at a temperature below about 160° C. and preferably between 80° C. and 130° C., under which conditions we have found that the catalyst can be maintained in a soluble state during the filtration with a minimum removal from the oxidation mixture. At least a portion of the withdrawn liquid is returned to the reaction vessel. Further details concerning the manner in which insolubilization of the catalyst takes place are set forth in Chester M. Himel, Patent No. 2,680,757. When the oxidation is carried out in this manner, adequate heat control is obtained over a long period of time without fouling the heat exchanger surface.

For a more complete understanding of the improved method which we have devised, reference is made to the accompanying drawing which sets forth in diagrammatic form an arrangement of processing equipment in which our method can be carried out. Fig. 1 will be explained in connection with typical operating conditions which can be employed in operating the equipment for toluic acid production.

Through line 1 and into reaction vessel 2 there is introduced at a rate of 50 pounds per hour and at 38° C. a petroleum xylene fraction having an API gravity of 35.3 and having a boiling range closely approximating that of xylenes. This fraction contains 82 per cent by weight of aromatics and 2.2 per cent by weight of olefins, the remainder being paraffins and naphthenes. The aromatics are mixed xylene isomers and about 10 per cent by weight of ethyl benzene, based on aromatics. Reaction vessel 2 is also provided with line 3 into which is introduced air in the amount of 500 cubic feet per hour, measured at 60° F. and one atmosphere, with line 4 for the removal of off-gas, with line 5 for the removal of liquid effluent product and with line 6 for the removal of a stream of reaction mixture for filtering, cooling and return to reaction vessel 2, as will be more fully explained. In reaction vessel 2 there is maintained a liquid level of reaction mixture having a temperature of 150° C., a pressure of 175 p. s. i. g. and cobalt catalyst in soluble form, this catalyst resulting from the introduction of 5 pounds of cobalt toluate into the reaction mixture at the beginning of the oxidation run.

Through line 6 by means of a pump 7 there is withdrawn a stream of reaction liquid at the rate of 655 pounds per hour. This stream is passed through enclosed continuous centrifuge 8 through which air is circulated by means of lines 9 and 10. Phthalic acids are separated in centrifuge 8 and filtered reaction liquid is then passed through line 11 to cooler 12. Cooler 12 has an inlet 13 and outlet 14 for cooling water. This stream leaves cooler 12 at 77° C. and is returned to reactor 2 by line 15. Toluic acid product in impure form is withdrawn through line 16 and can be further processed as described in Lester P. Berriman and Chester M. Himel application, Serial No. 321,488, filed November 19, 1952. If desired, product can be withdrawn through line 5 in addition to or rather than through line 16. During normal operation, however, we prefer to withdraw the entire product through line 16, as product withdrawal through line 5 yields a toluic acid product contaminated with phthalic acid. When all of the toluic acid product is withdrawn through line 16, the rate of product withdrawal therethrough is approximately 40 pounds per hour and this product is composed of about 25 per cent by weight of toluic acids, 15 per cent by weight of other oxidation products and 60 per cent by weight of xylenes.

As those skilled in the art will realize, various modifications can be made in the specific procedures just described to provide other embodiments which fall within the scope of our invention. In general, the operating temperature used in carrying out the oxidation will be from about 130 to about 190° C. and the operating pressure used will be from about 50 to about 500 p. s. i. g. (preferably 100 p. s. i. g. to 250 p. s. i. g.). Where operating temperatures in the upper portion of the aforementioned range are used, the liquid passing through line 6 into centrifuge 8 must be cooled in a heat exchanger in order that the liquid, at the time it is filtered, will have a temperature below about 160° C. Details concerning the oxidation of xylenes to form toluic acids are set forth in Chester M. Himel application, Serial No. 296,718, filed July 1, 1952.

We claim:

1. In the preparation of toluic acids by oxidizing the corresponding xylenes, the steps of introducing xylene and an oxygen-rich gas into a reaction vessel wherein the xylene is oxidized in a liquid phase maintained under elevated conditions of temperature and pressure and containing as a catalyst a salt which is soluble in the reaction mixture and which is selected from the group consisting of cobalt salts, manganese salts and cerium salts, the severity of the oxidation conditions being such that phthalic acid is formed in addition to toluic acid, withdrawing from the reaction vessel a stream of the reaction mixture present therein, filtering such stream in the presence of an oxygen-rich gas and at a temperature below about 160° C. whereby the catalyst present in such stream remains soluble therein and whereby precipitated phthalic acid is removed therefrom, cooling and returning filtered liquid to the reaction vessel, and removing off-gas from the reaction vessel.

2. The process according to claim 1 in which the catalyst is a cobalt salt and in which the filtering is performed at a temperature between 80° C. and 130° C.

No references cited.